No. 727,136. PATENTED MAY 5, 1903.
T. W. HEERMANS.
ELEVATOR HOISTING MECHANISM.
APPLICATION FILED DEC. 4, 1899.
NO MODEL. 5 SHEETS—SHEET 1.
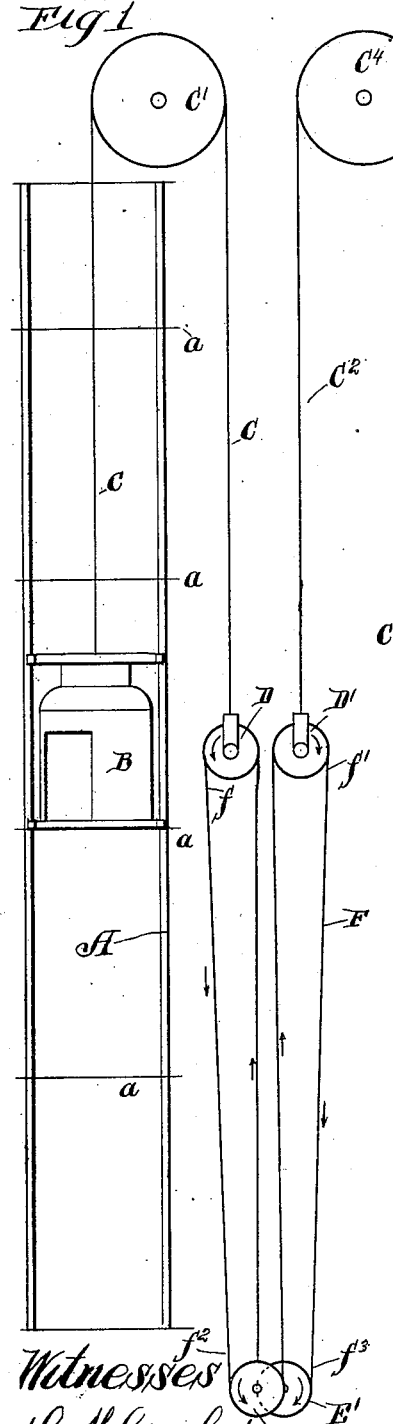
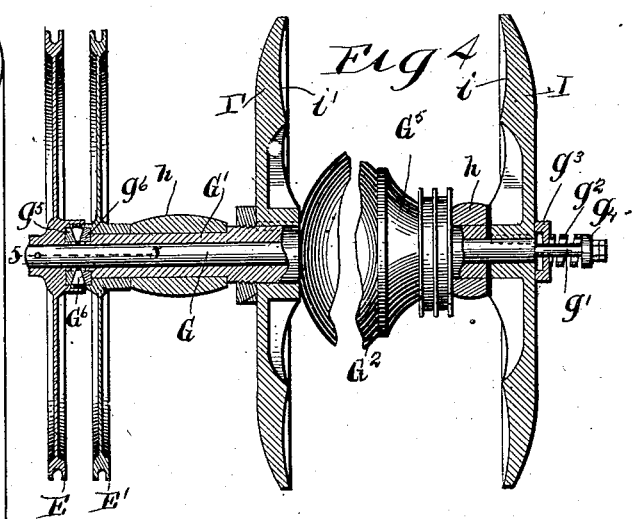
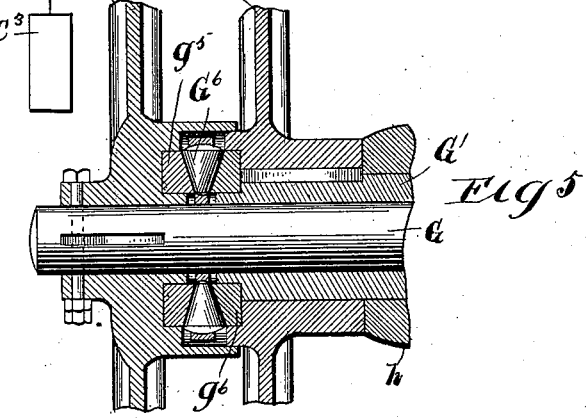
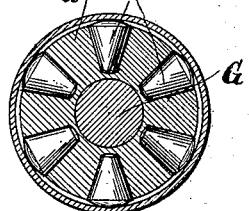
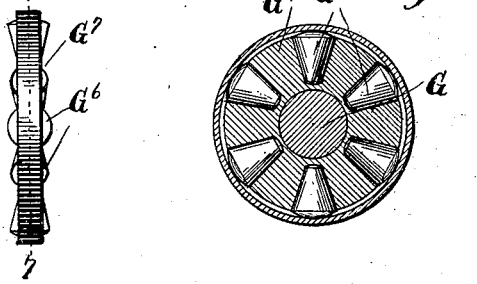
Inventor:
Thaddeus W. Heermans
by Poole + Brown
his Attorneys
Witnesses
C. H. Crawford
William L. Hall No. 727,136. PATENTED MAY 5, 1903.
T. W. HEERMANS.
ELEVATOR HOISTING MECHANISM.
APPLICATION FILED DEC. 4, 1899.

NO MODEL. 5 SHEETS—SHEET 2.

Witnesses
Inventor:—
Thaddeus W. Heermans
by Poole & Brown
his Attorneys

No. 727,136. PATENTED MAY 5, 1903.
T. W. HEERMANS.
ELEVATOR HOISTING MECHANISM.
APPLICATION FILED DEC. 4, 1899.
NO MODEL. 6 SHEETS—SHEET 3.

Witnesses:—
Carl H Crawford
William F Hall

Inventor:—
Thaddeus W. Heermans
by Poole & Brown
his Attorneys

No. 727,136. PATENTED MAY 5, 1903.
T. W. HEERMANS.
ELEVATOR HOISTING MECHANISM.
APPLICATION FILED DEC. 4, 1899.
NO MODEL. 6 SHEETS—SHEET 4.
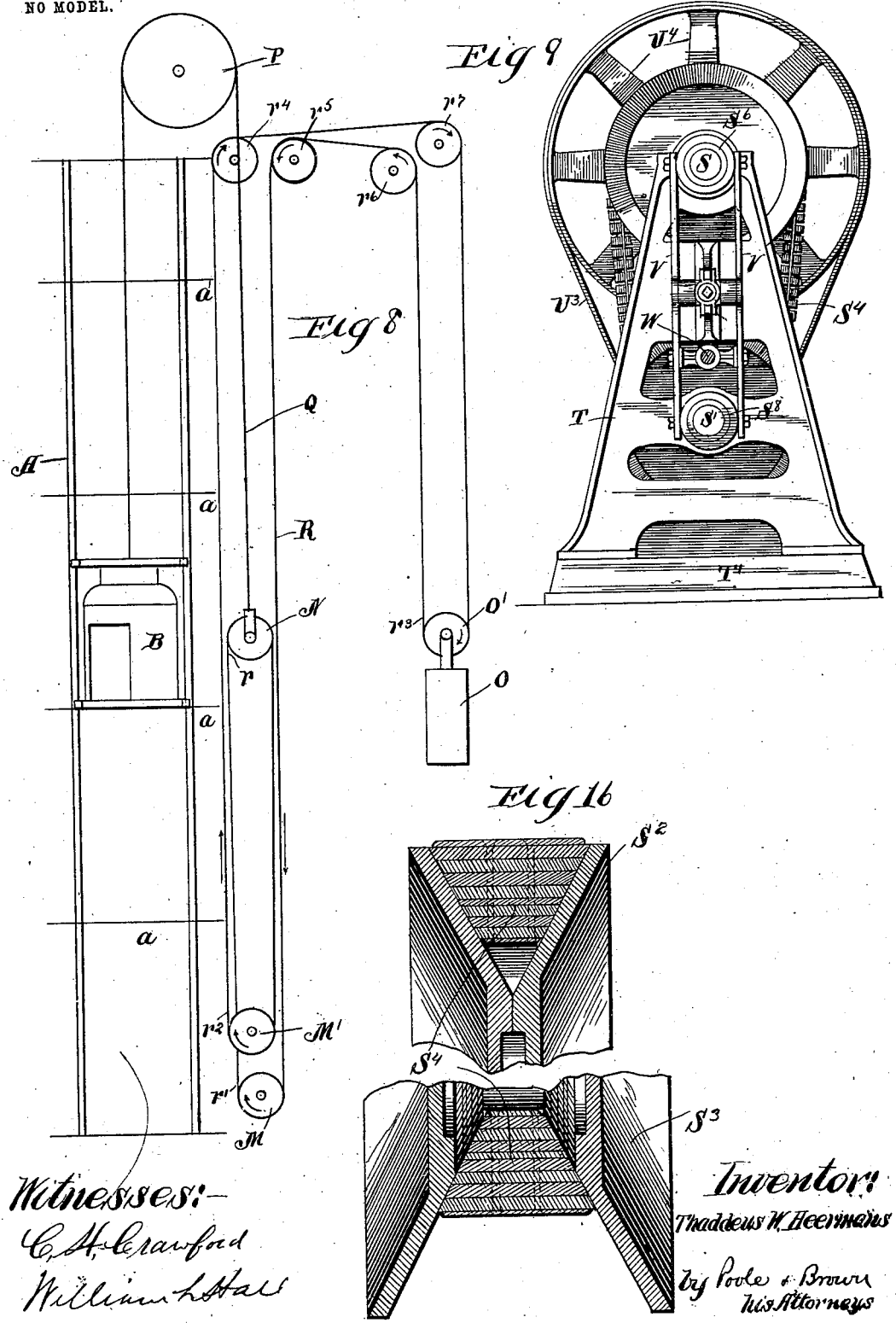
Witnesses:—
C. H. Crawford
William L. Hall
Inventor:
Thaddeus W. Heermans
by Poole & Brown
His Attorneys No. 727,136. PATENTED MAY 5, 1903.
T. W. HEERMANS.
ELEVATOR HOISTING MECHANISM.
APPLICATION FILED DEC. 4, 1899.
NO MODEL. 5 SHEETS—SHEET 5.
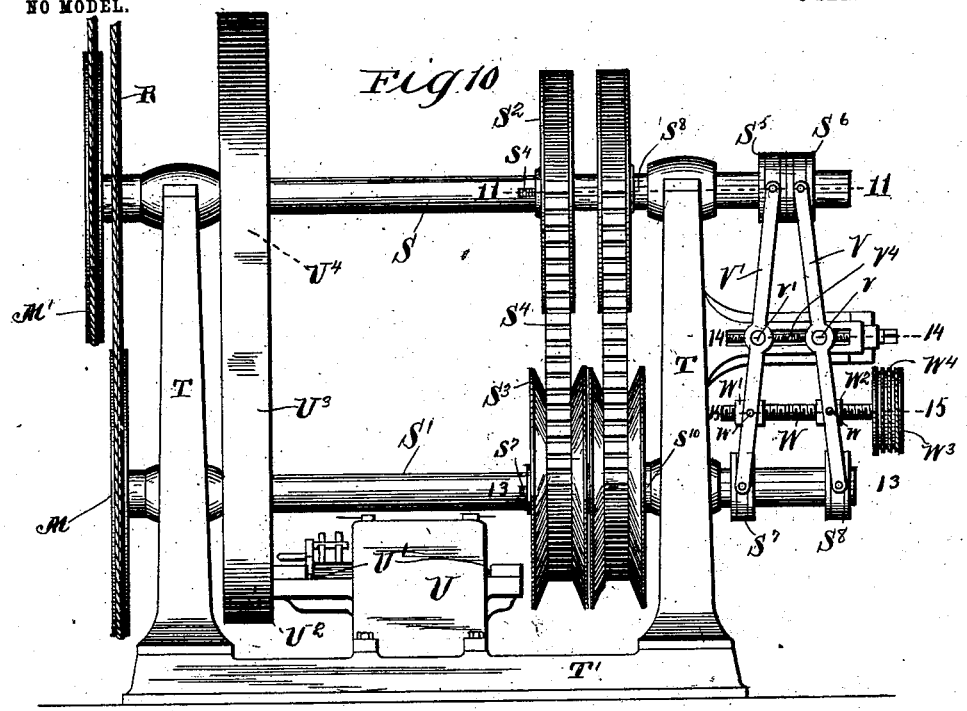
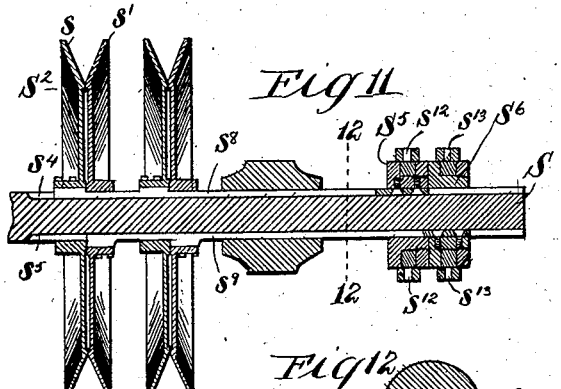
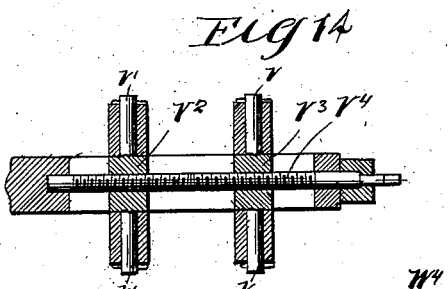
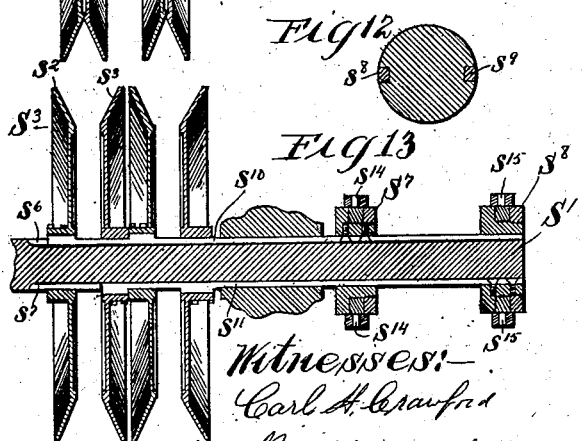
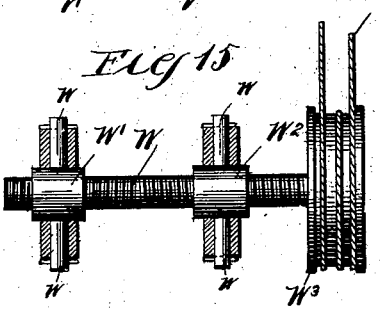
Witnesses:— Inventor:—
Carl H. Crawford Thaddeus W. Heermans
William L. Hall by Poole & Brown
his Attorneys No. 727,136. Patented May 5, 1903.

UNITED STATES PATENT OFFICE.

THADDEUS W. HEERMANS, OF CHICAGO, ILLINOIS.

ELEVATOR HOISTING MECHANISM.

SPECIFICATION forming part of Letters Patent No. 727,136, dated May 5, 1903.

Application filed December 4, 1899. Serial No. 739,068. (No model.)

*To all whom it may concern:*

Be it known that I, THADDEUS W. HEERMANS, of Chicago, in the county of Cook and State of Illinois, have invented certain new and useful Improvements in Elevator Hoisting Mechanism; and I do hereby declare that the following is a full, clear, and exact description thereof, reference being had to the accompanying drawings, and to the letters of reference marked thereon, which form a part of this specification.

This invention relates to improvements in frictional hoisting mechanism for elevator-cars, and embraces both an improved variable-speed motor for giving power to operate an elevator-car and an arrangement of the rope connections between said motor and the car for giving variable speed to the car.

The invention consists in the matters hereinafter set forth, and more particularly pointed out in the appended claims.

Figure 2:
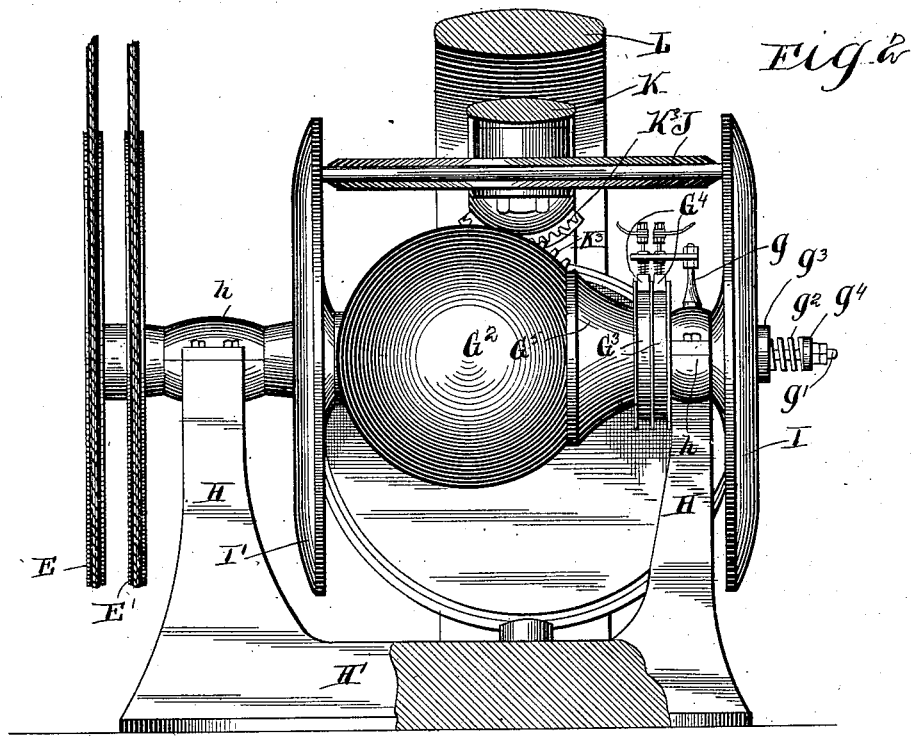
Figure 3:
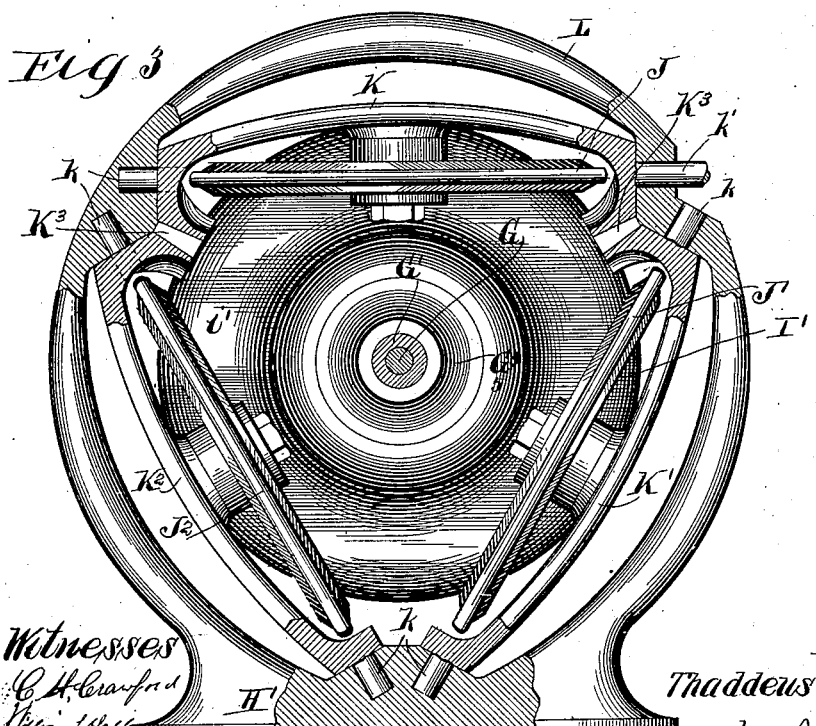
Figure 3A:
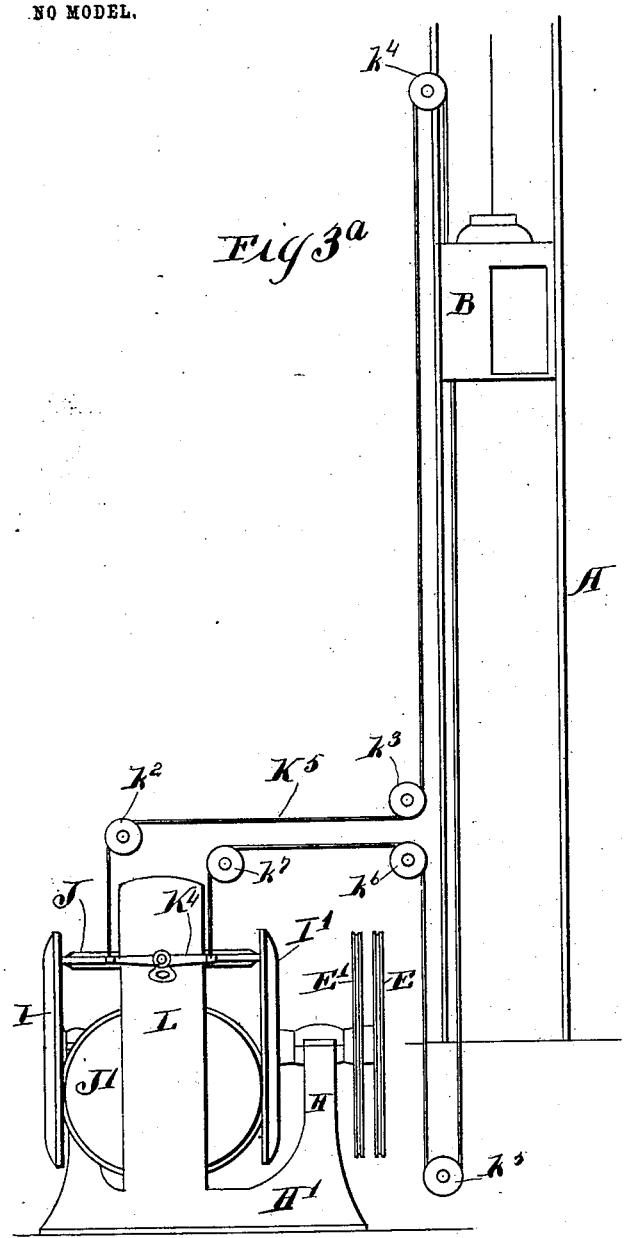
Figure 3B:
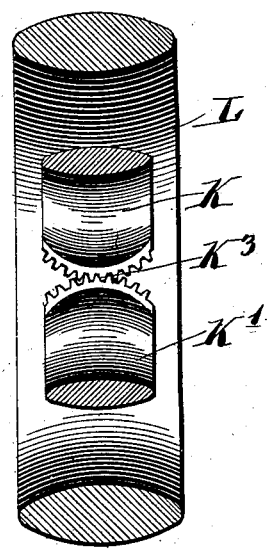

In the drawings, Figure 1 is a diagrammatic view, in side elevation, of an elevator-shaft and its car and showing also the driving-pulleys of the motor and the rope connections between the same and said car. Fig. 2 is a side elevation, partly in section, of one form of motor and change-speed device which may be employed in actuating said car. Fig. 3 is a view thereof looking in a direction at right angles to the view shown in Fig. 2 and showing the same partly in section. Fig. 3$^a$ is a diagrammatic view showing the actuating-lever for the change-speed device connected with the motor and the cable attached thereto and extending to the elevator-car. Fig. 3$^b$ is a fragmentary detail of the gear connections between two adjacent yokes carrying the oscillatory disks of the change-speed device looking at the same from the inside thereof. Fig. 4 is a view, partly in axial section, of said motor. Fig. 5 is a fragmentary section taken on the line 5 5 of Fig. 4. Fig. 6 is an edge elevation of the antifriction-rollers and cage, which are shown in place in the machine in Figs. 4 and 5. Fig. 7 is a section taken on line 7 7 of Fig. 6. Fig. 8 is a diagrammatic view, in side elevation, of an elevator car and shaft, showing a modified arrangement of the rope connections between the actuating-motor and the car. Fig. 9 is an end view of a motor and change-speed mechanism which is designed for use in connection with the construction shown in Fig. 8. Fig. 10 is a side elevation of said motor and change-speed mechanism. Fig. 11 is a section on the line 11 11 of Fig. 10. Fig. 12 is a cross-section on the line 12 12 of Fig. 11. Fig. 13 is a section on line 13 13 of Fig. 10. Figs. 14 and 15 are sections on lines 14 14 and 15 15 of Fig. 10. Fig. 16 shows two views of the expanding and contracting pulley which forms a part of the change-speed mechanism shown in Fig. 10.

First referring to the construction shown in Fig. 1, A designates an elevator shaft or well, $a$ the several floors of the building within which said shaft is located, and B the elevator-car. C designates the car-hoisting cable, which is attached at one end to the car and at its other end to a traveling sheave D, located outside of the elevator-shaft, and C' designates a guide-pulley, which is located above the elevator-shaft and within the bight of the hoisting-rope C. C$^2$ designates a counterweight-rope, which is attached at one end to a traveling sheave D' and at its other end to a counterweight C$^3$, and C$^4$ designates a guide-pulley, which is located at the level of the pulley C' and within the bight of the counterweight-rope C$^2$. E E' designate positively-driven pulleys, which are connected with and actuated by a suitable motor. Said pulleys in this construction are rotated in opposite directions, as indicated by the arrows marked thereon, and are also adapted to be rotated at differential speeds—that is to say, they are so driven that when the speed of one is retarding the speed of the other is accelerated to a corresponding extent. F designates an endless cable, which is trained around the driving-pulleys E E' and the traveling sheaves D D'. Said cable is arranged in two loops, having four bights $f f' f^2 f^3$, which engage, respectively, the traveling sheaves D D' and the driving-pulleys E E'. The direction of travel of each part of each loop of the cable is indicated by the arrows in Fig. 1. In the operation of a hoisting-gear thus arranged if the pulley E is driven faster than the pulley E' the descending part of the cable leading downward from the sheave D will move faster than the ascending part of the cable leading from the pulley E' to the said sheave D, and the latter will be drawn down, while at the same time the ascending part of the cable leading from the said pulley E to the sheave D' will travel upwardly faster than the descending part of said cable leading from said sheave to the said pulley E' moves downwardly, and said sheave D' will rise at the same speed that the sheave D descends. Under these conditions the car will ascend and the counterweight descend. When the pulley E' rotates faster than the pulley E, the action will be reversed and the car will descend and the counterweight ascend. Next referring to the motor and speed-change mechanism which I have herein shown as adapted for operating the elevator-car, the same is made as follows: The driving-pulley E is attached rigidly to a shaft G, which, as herein shown, forms the armature-shaft of an electric motor, and the driving-pulley E' is attached rigidly to a hollow shaft G', which surrounds parts of the shaft G and is attached to the field-magnet frame of said motor. The armature and the field-magnets of said electric motor rotate, but in opposite directions. The shaft G has bearing in the tubular shaft G', while the tubular shaft is rotatively mounted in bearings $h\,h$, which are attached to the upper ends of standards H H, which standards are at their lower ends attached to or formed integral with a base-plate H'. Said motor is inclosed by a rounded casing $G^2$. $G^3$ designates the collector-rings, and $G^4$ the collector-brushes, which are supported by a standard $g$, connected with the bearing $h$. A part $G^5$ of the motor-casing adjacent to the collector-rings is herein shown as made separate from the other part thereof, so that it may be removed to afford access to the casing for the purpose of inserting the field-magnets and the armature. I I' designate friction-disks which are connected rigidly with the shafts G and G', respectively, and rotate therewith. The hollow shaft G' terminates flush with the outer face of the bearing $h$ adjacent to the armature, and the disk I is mounted on the inner shaft G outside of said bearing and tubular shaft. Said disk is held from rotation on the shaft by means of a key, as shown in Fig. 4, but fits thereon in such manner that it may be moved endwise on the shaft. The disk I' is keyed to shaft G' on the side of the motor opposite to the disk I and is longitudinally immovable thereon. The said disks I I' are provided on their adjacent faces near the margins thereof with opposing annular concave friction-surfaces $i\,i'$, which conform in cross-sectional shape to the segments of a circle, the center of which is located midway between the disks. Between said disks are located a plurality of oscillatory disks J J' $J^2$, herein shown as three in number. The said disks are pivotally supported in such manner that each of them may turn, swing, or oscillate about an axis transverse to its axis of rotation and passing through the center of a circle the circumference of which coincides with the opposing concave annular surfaces of the disks I I', whereby when said disks are rotated about their axis they will retain constant peripheral contact with the disks I I'. When each of the disks is in such position that its axis of rotation is located at right angles to the axes of the shafts G G', it will bear against the concave surfaces of the disks I I' at points equidistant from the inner and outer margins of the annular concave surfaces thereof, so that both of said friction-disks will be rotated at equal speeds. When, however, the said oscillatory disk is turned about its transverse axis, its point of contact with one of the friction-disks will be moved inwardly or toward its center, while its point of contact with the other friction-disk will be moved outwardly or away from its center. This will result in the speed of one of the friction-disks being diminished, while the speed of the other disk will be to an equal extent increased. Said oscillatory disks are arranged to be simultaneously rotated about their axes. Obviously one disk will serve the purpose of transmitting motion from one friction-disk to the other; but three disks are herein shown, which are so disposed about the centers of the friction-disks as to equalize the pressure on said disks and to equalize the pressure on the shafts supporting them. The form of support herein shown as employed for said oscillatory disks consists of yoke-pieces K K' $K^2$, which are provided at their ends with journals $k\,k'$, which have bearing in journal-apertures formed in a circular frame L, which surrounds the motor and is connected at its lower end with the base-piece H' and in said base-piece. As herein shown, said base-piece and circular frame L are cast integral with each other. One of the bearing-studs of each yoke-piece is made separate therefrom and has screw-threaded engagement therewith to afford means for readily inserting the same in place. The said yoke-pieces K K' $K^2$ are provided adjacent to the uppermost bearing-journals with segmental gears $K^3$, which mesh with each other and whereby turning one of said yokes causes a like movement of the other yokes. One of said bearing-journals $k\,k'$— the one connected with the horizontal yoke, Fig. 3—is extended through the frame L to provide means for turning or moving said yokes through actuating means located outside of said frame. As shown in said Fig. $3^a$, said journal has attached to its outer end a cross-bar $K^4$. To said cross-bar are attached the opposite ends of an actuating-cable $K^5$, which cable is trained about guide-pulleys $k^2$, $k^3$, $k^4$, $k^5$, $k^6$, and $k^7$, and passes through the car B, as indicated in Fig. $3^a$, whereby the oscillatory disks may be actuated by the car conductor to either stop the car, reverse its direction, or change its speed, as desired. It will be understood that in the position of the disks shown in Figs. 3 and $3^a$ the driving-pulleys E E' will rotate at equal speeds and by reason of the arrangement and construction of the connections between said driving-pulleys and the elevator said elevator will at this time be stationary. The oscillatory disks J, J', and J² are provided on their peripheries with yielding bands or tires, made of rubber or the like, whereby the necessary frictional engagement may be had of the same with the friction-disks I I'. In order to provide for the proper frictional contact of said friction-disks with the oscillatory disks, the disk I, as before stated, is fitted on the shaft G, so as to be movable longitudinally of said shaft. The said disk I when the machine is assembled will not bear against the shoulder formed by the bearing $h$ adjacent thereto, but a space will be left between the same, as shown in Fig. 4, so as to permit slight inward movement of the said disk under the action of a suitable spring to provide for wear in the margins of the oscillatory disks. As herein shown, said shaft G is provided at its outer end with an extension $g'$, which is surrounded by a spiral spring $g^2$, which spring bears at its inner end against a washer $g^3$ in contact with the disk which is slipped over said extension, and bears at its other end against a nut $g^4$, which has screw-threaded engagement with the end of said extension. Desirably antifriction-bearings will be located between the pulleys E E' on the shaft G to reduce to a minimum the friction between said oppositely-moving pulleys. As herein shown, said antifriction-bearings are made as follows: $g^5$ designates a hard-metal ring which is pressed into an annular groove in the inner face of the hub of the wheel E, and $g^6$ designates a similar ring which is pressed into a like groove formed in the adjacent face of the hub of the pulley E'. The inner faces of said bearing-rings are made conical or inclined, the same being closer together near shaft than at the peripheries thereof, and between said inclined faces of the bearing-rings are interposed a plurality of conical rollers $G^6$. Said rollers are held in place by being inserted within suitably-shaped recesses or sockets in a caging-ring $G^7$, which is slipped over the shaft between said bearing members. The operation of this form of my invention is as follows: As before stated, when the driving-pulleys E E' are moved at equal speeds the traveling pulleys D D' will remain stationary, so that both the car and the counterweight will be at a standstill. If, however, one of the driving-pulleys be moved faster than the other, it will cause movement of one of the traveling sheaves and the parts connected therewith. In order to move one of said driving-pulleys faster than the other, the several disks J J' J² will be oscillated on axes transverse to their axes of rotation, so as to move the peripheries thereof inwardly and outwardly on the concave surfaces of the disks I I', which will cause the speed of one of said disks and the driving-pulley connected therewith to be retarded to the same extent that the speed of the other disk and driving-pulley is increased, it being understood that the sum of the speeds of said driving-pulleys remains constant, notwithstanding the variation in speed of each driving-pulley. Referring now more particularly to Fig. 1, it will be assumed that the driving-pulleys E E' are driven at the same rate of speed, and the elevator-car and counterweight are therefore stationary. If, however, the pulley E, which is connected with the armature-shaft be driven at a greater speed than the pulley E', it will be seen that the cable F will be paid out from the pulley E toward the sheave D' more rapidly than it will be taken up by the driving-pulley E', and also that said cable will be paid out from the opposite side of the pulley E' less rapidly than it is taken up by the receiving side of the pulley E. The pulleys D D' are free to rotate as rapidly as conditions may require and are also free to travel upwardly and downwardly. The result will be that the sheave D' will be moved upwardly by reason of the upward pull given thereto to the counterweight to take up the slack in the cable on the paying-out side of the pulley E, and said pulley E will by reason of the friction between the cable and the pulley take in the cable on the receiving side thereof more rapidly than it is paid out on the discharging side of the pulley E', which will cause the sheave D to be moved downwardly and the car to be moved upwardly at a speed proportionate to the difference between the speed of the parts of the cable on the opposite sides of the traveling pulley D. The car will therefore move upwardly at a uniform speed so long as the relative speeds of the driving-pulleys are maintained and the counterweight moved downwardly in the usual manner. The speed of the car may be varied by moving the peripheries of the oscillatory disks toward or from the centers of the friction-disks; but the motion of the car will not be entirely arrested until the said oscillatory disks are again moved into such position that they have peripheral contact with the concave surfaces of said friction-disks at points equidistant from the margins thereof. When the direction of movement of the car is to be reversed, the oscillatory disks will be oscillated to bring those parts of the peripheries thereof which were before between the intermediate position of the oscillatory disks and the center of the disk outside of said intermediate position of the oscillatory disks and between the same and the outer margins of said concave surfaces. The change of position of the oscillatory disks results in giving to the driving-pulley E' a peripheral speed greater than that of the pulley E. When this occurs, the cable F will be paid out from the delivery side of the pulley E' more rapidly than it is received by the pulley E and will also be received upon the pulley E' more rapidly than it is paid out from the pulley E. The result of this arrangement is that a slack occurs in the cable on the receiving side of the traveling sheave D, and by reason of the fact that the said pulley is movable and the weight of the elevator tends at all times to move the same upwardly such slack will be taken up by the upward movement of said sheave and the downward movement of the elevator-car. Further, the fact that the cable is received more rapidly upon the pulley E' than it is paid out from the pulley E the traveling sheave D' will be moved upwardly, thereby carrying the counterweight upwardly in a direction the reverse of that to the elevator-car and to a like distance. In this direction also the speed of the car will be correlative to the difference of speed between the driving-pulleys E E', and the car will be brought to a stop by restoring the oscillatory disks to their intermediate positions.

Next referring to the construction shown in Figs. 8 to 16, inclusive, the same is made as follows: M M' designate driving-pulleys, which are connected with and driven from a suitable motor and having interposed between the same and the elevator a change-speed device. N designates freely-rotatable traveling sheave. O designates a counterweight, and O' a sheave connected therewith. P designates a guiding-pulley located above the elevator shaft or well A. Q designates a hoisting-cable, which is attached at one end to the sheave-block N and at its other end to the elevator-car B. R designates an endless cable, which is trained about the driving-pulleys M M', the traveling sheave N, and the counterweight-sheave O' and is divided into four principal bights—namely, the bight $r$, within which the traveling sheave N is located, the bight $r'$, within which the driving-pulley M is located, the bight $r^2$, within which the driving-pulley M' is located, and the bight $r^3$, within which the counterweight-sheave O' is located. $r^4$ $r^5$ $r^6$ $r^7$ designate direction-pulleys located at or near the upper end of the elevator-shaft and which serve to give the proper direction of movement to the parts of said cable. In this construction the sheave O' corresponds with one of the sheaves D D' in the prior construction and the sheave N' corresponds with the other of said sheaves of the prior construction. The driving-pulleys M M' in this construction rotate in the same direction, but are adapted to be given variable speeds with respect to each other, as in the construction before described. Next referring to the motor and the speed-changing device by which the hoisting mechanism is operated, the said device is shown in Figs. 9 to 16, inclusive, and is made as follows: S S' designate two parallel horizontal shafts, of which the shaft S has bearing in the upper end of vertical standards T T and the shaft S' has bearing near the lower end of said standards. Said standards are mounted upon or formed integral with a base-casting T' which supports the same. The pulley M' is attached to and rotated by the shaft S, while the pulley M is attached to and rotated by the shaft S'. U designates an electric motor which is mounted on base-plates, which drives said change-speed device. Connected with the armature-shaft U' of said motor is a driving-pulley U² which through the medium of a belt U³ and a pulley U⁴ on the shaft S drives said last-mentioned shaft. S² designates a pulley mounted on the shaft S, and S³ designates a similar pulley mounted on the shaft S', vertically below said pulley S². Said pulleys are connected and the pulley S³ driven from the pulley S² through the medium of a belt S⁴. Said pulley S² is made of two laterally-separated parts $s$ $s'$, which have movement toward and from each other, and the pulley S³ is made of two like movable parts $s^2$ $s^3$. Said parts of the pulley are provided on their adjacent faces near the periphery thereof with opposing annular inclined surfaces, which are closer together at the inner margins of said inclined surface than at the outer margins thereof. Such inclinations of the parts of the wheel provide when said parts are moved closely adjacent to each other annular grooves in the pulleys, which are triangular or V-shaped in cross-section and which are engaged by the belt S⁴, the latter being made of like cross-sectional form. One of said pulleys is designed to be expanded or the parts thereof moved laterally away from each other, at the same time the other pulley is contracted as shown in Fig. 10. On the contracted pulley the belt bears against and receives its motion from the annular inclined surface near the periphery of the wheel, while the said belt bears against and receives its motion from the radially inner parts of said inclined surfaces of the pulley which is expanded. When the belt engages the radially inner parts of said inclined surfaces, it is given a less rapid movement when the said pulley is a driving-pulley, or the belt gives to said pulley a more rapid movement if the belt be driving the same than if said pulley engage the parts of said inclined surface near the peripheries of the pulleys. If the pulleys be equally expanded and the belt engage the same at points equidistant between the inner and outer edges of the inclined parts, the shafts S S' and the driving-pulleys connected therewith will be rotated at equal speeds. If, as shown in Fig. 10, the lower pulleys are expanded while the upper pulleys are contracted, (the upper pulleys being the driving-pulleys,) the lower pulleys will be rotated at a greater speed than the upper pulleys. Means are provided for giving simultaneous movements to the parts of the upper and lower pulleys, whereby when one is expanded the other is equally contracted, and vice versa. Said means are made as follows: Said shafts are provided on diametrically opposite sides with keyways or grooves $s^4$ $s^5$ $s^6$ $s^7$. Within said keyways are located longitudinally-slidable keys $s^8$ $s^9$ $s^{10}$ $s^{11}$ The keys $s^8$ $s^{10}$ of the two shafts are each rigidly connected with one side or part of one of the pulleys $S^2$ $S^3$. The keys $s^9$ $s^{11}$ are each similarly connected with the opposite side or part of one of said pulleys, so that when movement is given to the keys it will give corresponding movement to the parts of the pulleys to which they are attached. The keys of each shaft are adapted to be simultaneously moved in opposite direction, whereby the two parts of the pulley connected therewith will move equally in opposite directions, but the center of the line of the pulley will not be changed. Means for actuating said keys and the parts of the pulleys connected therewith are provided as follows: $S^5$ $S^6$ designate two collars on the upper shaft F, which are provided with oppositely-extending lugs $s^{12}$ $s^{13}$. $S^7$ $S^8$ designate similar collars on the shaft $S'$. Said collars are free to slide on said shafts. The collar $S^5$ is connected by screws in the manner shown with the key $s^8$, while the collar $S^6$ is connected in a similar manner with the key $s^9$. The collars $S^7$ and $S^9$ are similarly provided with oppositely-extending lugs $s^{14}$ $s^{15}$. Said collar $S^7$ is connected with the key $s^{10}$ by screws in the manner shown, while the collar $S^8$ is connected with the key $s^{11}$ in a similar manner. V V' designate two pairs of levers, which are pivoted at their longitudinal centers upon studs $v$ $v'$ and are provided at their outer ends with bearing-apertures which have bearing engagement with the studs $s^{12}$ $s^{13}$ $s^{14}$ $s^{15}$ of the collars $S^5$ $S^6$ $S^7$ $S^8$. With this construction when the levers and collars connected therewith are separated at one end the other end thereof and connected collars are brought together, and vice versa. Said levers are moved away from and toward each other by means of a screw-shaft W, which has screw-threaded engagement with the blocks $W'$ $W^2$, which are pivoted to the lever near the lower ends thereof by means of pivot-studs $w$, which engage bearing-apertures in the levers V V'. The pivot connections of the blocks with the levers permits said blocks to be maintained in proper position with the bearing-apertures thereof in alinement, notwithstanding the divergence or convergence of the levers. Said actuating-shaft W is provided at its outer end with a drum $W^3$, upon which an actuated cable $W^4$ is adapted to be wound, the other end of which cable is extended to the elevator-car and is accessible to the conductor thereof. With this construction it will be evident that as the screw actuating-shaft is rotated it will cause the levers at one of their ends to approach each other and at their other ends to recede from each other and will cause a corresponding expansion and contraction of the pulleys $S^2$ $S^3$. Preferably the pivot-studs $v$ $v'$ are movable in a horizontal plane, so as to permit the same to be separated or brought closer together. As herein shown, said pivot-studs are attached to blocks $V^2$ $V^3$, which have engagement with a guide-slot in a horizontal projection from the adjacent standard T. Said blocks are provided with screw-threaded apertures and have screw-threaded engagement with a shaft $V^4$, which passes axially through said arm and has rotative but not endwise movement in said arm. With this construction rotation of said screw-shaft causes the pivot-studs to move toward or from each other, depending on the direction in which the shaft is rotated. The purpose of the adjustment is to control or limit the maximum extent of the movement of the collars on the shaft and the expansion and contraction of the pulleys $S^2$ $S^3$, and thereby control the maximum speed which is to be given to the elevator-car. In practice the positions of the pivots $v$ $v'$ will be determined when the apparatus is installed in the building and will not ordinarily thereafter be required to be changed. The operation of this form of my invention is as follows: The driving-pulleys M $M'$ are rotated in the same direction. If it be assumed that the same are rotated at the same speed, or, in other words, the pulleys $S^2$ $S^3$ are equally expanded, the traveling sheaves N and $O'$ will remain stationary, and consequently no motion will take place in the elevator-car or the counterweight. If, however, it be assumed that the pulley M is rotated at a greater speed than the pulley $M'$, the cable R will be paid out from the said pulley M more rapidly than it will be received upon the pulley $M'$, and, further, said cable will be received upon said pulley M more rapidly than it is paid out from the pulley $M'$. The result of such arrangement will be that a slack will occur in the cable on the receiving side of the sheave N, and such sheave, owing to the fact that it is freely rotatable and free to move upwardly and downwardly, will move upwardly under the upward pull due to the weight of the elevator-car to take up such slack and permit the elevator-car to move downwardly. Moreover, said pulley M, receiving the cable more rapidly than it is paid out from the pulley $M'$, will, by reason of the friction between the cable and the pulley and owing to the fact that the part of said cable on the receiving side of the sheave $O'$ moves at a less speed than the part on the paying-out side, cause said counterweight to rise to the same extent that the car descends. If, on the other hand, it be assumed that the driving-pulley $M'$ is being rotated at a more rapid speed than the pulley M, the cable will be paid out from said pulley $M'$ more rapidly than it is received upon the pulley M, and owing to the fact that the parts within which the sheave $O'$ is located between the paying-out side of the pulley $M'$ and the receiving side of the pulley M the slack which occurs in the rope between said paying-off side $M'$ and the said sheave will be taken up by the sheave $O'$ and the counterweight caused to descend. Moreover, owing to the fact that the cable is received upon the pulley $M'$ more rapidly than it is paid out from the pulley M and because of the further fact that the sheave N is located between the receiving side of the pulley M and delivering side of the pulley M' said sheave N will be pulled downwardly and by reason of the connection therewith of the elevator will cause the elevator to ascend in an opposite direction and to an extent corresponding with the movement of the counterweight O. Obviously the movement of the car in either direction will be determined by the extent of expansion and correlative contraction of the pulleys S² S³, and when said pulleys are equally contracted the driving-pulleys M M' will be moving at equal speeds and the elevator-car will be at a standstill.

I claim as my invention—

1. An elevator apparatus comprising a car and a counterweight, traveling sheaves connected with said car and counterweight, an endless cable trained about said sheaves, two driven wheels around which the endless cable also passes, a single motor arranged to drive both wheels and means for varying the relative speeds of the wheels.

2. An elevator apparatus comprising a car and a counterweight, traveling sheaves connected with said car and counterweight, an endless cable trained about said sheaves, two driven wheels around which the endless cable also passes, a single motor arranged to drive both wheels, and means controlled from the car for varying the speeds of the wheels.

3. The combination with an elevator-car and a counterweight, traveling sheaves connected with said car and counterweight, an endless cable trained about said sheaves, two driven wheels around which the endless cable also passes, each of which is designed to be driven at variable speeds, and means for varying the relative speeds of said wheels.

4. An elevator apparatus comprising a car and a counterweight, each connected with a suspensory cable, an endless cable with which the suspensory cables are associated, two driven wheels around which said cable passes, a single motor arranged to drive both wheels and means for varying the relative speeds of the wheels.

5. The combination with an elevator-car, of a single motor, two driven wheels through which motion is transmitted to said car and which are driven by said motor, a change-speed gear interposed between said wheels and connected in such manner therewith that when the speed of one of the wheels is retarded the speed of the other wheel is correspondingly increased and vice versa and the applied power of the motor remains constant.

6. The combination with an elevator and a counterweight, of a differential hoisting mechanism therefor comprising two oppositely-rotating shafts, friction-disks connected with and driven by said shafts and rotating on a common axis, said friction-disks being provided on their adjacent faces with opposing, concave annular depressions, an oscillatory disk which has opposite peripheral contact with said annular depressions of the disks and adapted to oscillate about an axis transverse to its axis of rotation, driving-pulleys severally connected with and driven by said shafts, traveling sheaves connected with said elevator and counterweight, and an endless cable trained about said sheaves and driving-pulleys.

7. The combination with an elevator and a counterweight, of a differential hoisting mechanism therefor, comprising two oppositely-rotating shafts, friction-disks connected with and driven by said shafts and rotating on a common axis, said friction-disks being provided on their adjacent faces with opposing, concave, annular depressions, an oscillatory disk which has opposite peripheral contact with the said annular depressions of the disks and which oscillates about an axis transverse to its axis of rotation, means for giving oscillatory motion to said disk, driving-pulleys severally connected with and driven by said shafts and connections between said driving-pulleys and the elevator-car and counterweight.

8. The combination with an elevator-car and a counterweight, of a differential hoisting mechanism therefor comprising two rotative shafts, one of which is tubular and surrounds the other, two friction-disks, one connected with the tubular shaft and the other with the inner shaft, an oscillatory disk which has opposite peripheral engagement with said disks and which is adapted to oscillate about an axis transverse to its axis of rotation, driving-pulleys connected severally with said shafts, and driving connections between said driving-pulleys and the car and counterweight.

9. The combination with an elevator-car and a counterweight, of a differential hoisting mechanism therefor, comprising two rotative shafts, one of which is tubular and surrounds the other, two friction-disks, one connected with the tubular shaft and the other with the inner shaft, an oscillatory disk which has opposite peripheral engagement with said disks and which is mounted to oscillate about an axis transverse to its axis of rotation, a driving-pulley connected with each of said shafts, one of said friction-disks being movable endwise on its shaft, a spring applied to provide means for maintaining constant frictional engagement between the friction and oscillatory disks, and connections between the driving-pulleys and the elevator-car and counterweight.

10. The combination with an elevator-car and a counterweight, of a differential hoisting mechanism therefor, comprising two rotative shafts, friction-disks connected with and driven by said shafts and rotating about a common axis, an oscillatory disk which has opposite peripheral engagement with the opposing faces of said disks and which is mounted to oscillate about an axis transverse to its axis of rotation, an oscillatory frame carrying said oscillatory disk, means actuating the car and counterweight from said rotative friction-disks, and means for oscillating said frame and controlled from the car.

11. The combination with an elevator-car and counterweight, of a differential rope hoisting mechanism therefor comprising two rotative shafts, two friction-disks connected with and driven by said shafts and which rotate on a common axis, a plurality of oscillatory disks which have opposite peripheral engagement with the opposing faces of said friction-disks and which oscillate about axes transverse to their axes of rotation, means giving simultaneous oscillatory motion to said disks, driving-pulleys severally connected with and driven by said shafts and connections between said pulleys and the car and counterweight.

12. The combination with an elevator-car and a counterweight, of a differential rope hoisting mechanism therefor comprising two oppositely-rotative shafts, two friction-disks connected with and driven by said shafts and which rotate on a common axis, a plurality of oscillatory disks which have opposite peripheral contact with the opposing faces of said disks and which are mounted to oscillate about axes transverse to their axes of rotation, frames which carry said oscillatory disks provided with intermeshing gears whereby the same may be simultaneously oscillated, and means for actuating the car and counterweight from said rotative shafts.

13. The combination with an elevator-car and a counterweight, of a differential rope hoisting mechanism therefor comprising two rotative shafts, one of which is tubular and surrounds the other, two friction-disks connected with said shafts, an oscillatory disk which has opposite peripheral engagement with the opposing faces of said disks, a driving-wheel mounted on one end of said tubular shaft, a second driving-wheel mounted on the adjacent end of the central shaft, antifriction-bearings between the hubs of said driving-wheels and driving connections between said driving-wheels and the car and counterweight.

In testimony that I claim the foregoing as my invention I affix my signature, in presence of two witnesses, this 25th day of November, A. D. 1899.

THADDEUS W. HEERMANS.

Witnesses:
C. CLARENCE POOLE,
C. W. HILLS.